United States Patent
Park et al.

(10) Patent No.: US 10,109,838 B2
(45) Date of Patent: Oct. 23, 2018

(54) RECHARGEABLE BATTERY AND MANUFACTURING METHOD THEREOF

(71) Applicant: SAMSUNG SDI CO., LTD., Yongin-si, Gyeonggi-do (KR)

(72) Inventors: Sang-Kyoon Park, Yongin-si (KR); Yong-Chul Seo, Yongin-si (KR); Seung-Ho Kwak, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 500 days.

(21) Appl. No.: 14/749,574

(22) Filed: Jun. 24, 2015

(65) Prior Publication Data

US 2016/0099457 A1    Apr. 7, 2016

(30) Foreign Application Priority Data

Oct. 7, 2014    (KR) .................. 10-2014-0135108

(51) Int. Cl.
*H01M 2/26* (2006.01)
*H01M 10/04* (2006.01)
*H01M 2/30* (2006.01)

(52) U.S. Cl.
CPC ....... *H01M 2/266* (2013.01); *H01M 10/0431* (2013.01); *H01M 2/305* (2013.01)

(58) Field of Classification Search
None
See application file for complete search history.

(56) References Cited

U.S. PATENT DOCUMENTS

| 2010/0310927 A1 | 12/2010 | Imai et al. | |
| 2012/0021274 A1* | 1/2012 | Kim | H01M 2/263 429/151 |
| 2012/0107655 A1* | 5/2012 | Lee | H01M 2/26 429/94 |

FOREIGN PATENT DOCUMENTS

| JP | 2007-115584 A | 5/2007 |
| JP | 2009-277643 A | 11/2009 |

OTHER PUBLICATIONS

Machine English Translation of JP 2007-115584 A, 14 pages.

* cited by examiner

*Primary Examiner* — Barbara L Gilliam
*Assistant Examiner* — Adam A Arciero
(74) *Attorney, Agent, or Firm* — Lewis Roca Rothgerber Christie LLP

(57) ABSTRACT

A rechargeable battery includes: a first electrode assembly and a second electrode assembly, each of the first and second electrode assemblies including a first electrode and a second electrode, each of the first and second electrodes including an electrode plate and an electrode uncoated region; a case accommodating the first and second electrode assemblies; a cap assembly sealing the case; a first current collecting member electrically connecting the first electrode of the first electrode assembly and the first electrode of the second electrode assembly; and a second current collecting member electrically connecting the second electrode of the first electrode assembly and the second electrode of the second electrode assembly. Each of the first and second current collecting members includes a first current collecting plate coupled with a connecting terminal, and a second current collecting plate, one surface of the second current collecting plate contacting at least one of the electrode uncoated regions.

9 Claims, 14 Drawing Sheets

RECHARGEABLE BATTERY AND MANUFACTURING METHOD THEREOF

CROSS-REFERENCE TO RELATED APPLICATION

This application claims priority to and the benefit of Korean Patent Application No. 10-2014-0135108 filed in the Korean Intellectual Property Office on Oct. 7, 2014, the entire content of which is incorporated herein by reference.

BACKGROUND

1. Field

One or more embodiments of the present invention relate to a rechargeable battery and a manufacturing method thereof.

2. Description of the Related Art

A rechargeable battery differs from a primary battery in that the former can be repeatedly charged and discharged, while the latter cannot be recharged.

A low-capacity rechargeable battery can be used in small portable electronic devices such as mobile phones, notebook computers, and camcorders, while a high-capacity rechargeable battery can be used as a power source for driving a motor of a hybrid vehicle or the like.

Recently, a high power rechargeable battery using a non-aqueous electrolyte and having high energy density has been developed. Such high power rechargeable battery typically includes a large-capacity rechargeable battery in which a plurality of rechargeable batteries are connected in series, and which can be used as a power source for a device requiring a large amount of electric power, for example, for driving a motor of an electric vehicle or the like.

A rechargeable battery typically includes an electrode assembly formed by positioning a separator (which acts as an insulator) between positive and negative electrode plates, injecting an electrolyte solution into a case, and sealing the case by a cap assembly.

However, when an external impact is applied to the rechargeable battery, the insulator (e.g., the separator), the electrode assembly, or the like may be damaged by the tabs or current collecting members of the battery. Such damage may cause overheating or explosion of the rechargeable battery.

SUMMARY

One or more embodiments of the present invention provide a rechargeable battery in which a possibility of damage to an electrode assembly, an insulator, or the like can be prevented or reduced.

In one embodiment of the present invention, a rechargeable battery includes: a first electrode assembly and a second electrode assembly, each of the first and second electrode assemblies including a first electrode and a second electrode, each of the first and second electrodes including an electrode plate and an electrode uncoated region; a case accommodating the first and second electrode assemblies; a cap assembly sealing the case; a first current collecting member electrically connecting the first electrode of the first electrode assembly and the first electrode of the second electrode assembly; and a second current collecting member electrically connecting the second electrode of the first electrode assembly and the second electrode of the second electrode assembly. Each of the first and second current collecting members includes a first current collecting plate, coupled to a connecting terminal, and a second current collecting plate, one surface of the second current collecting plate contacting at least one of the electrode uncoated regions.

The electrode uncoated regions may contact the surface of the second current collecting plate facing the cap assembly.

The first current collecting plate may include a first terminal hole through which the connecting terminal is inserted.

The connecting terminal may be further inserted through a second terminal hole in the cap assembly.

The first and second current collecting plates may have a step therebetween.

A height of the step may correspond to a height of the electrode uncoated region in a direction extending toward the cap assembly.

A width of the second current collecting plate may be greater than that of the first current collecting plate in a direction extending across the first and second electrode assemblies.

The electrode uncoated regions may each independently include a first uncoated region protruding toward the cap assembly from the respective electrode plate, and a second uncoated region bent from the first uncoated region, at least a portion of one surface of the second uncoated region contacting one of the first and second current collecting members.

The portion of one surface of the second uncoated region contacting one of the first and second current collecting members may face the electrode assembly.

The electrode uncoated regions of the first electrodes of each of the first and second electrode assemblies may be bent to face each other, and the electrode uncoated regions of the second electrodes of each of the first and second electrode assemblies may be bent to face each other.

The first and second electrode assemblies may be each independently spirally wound around a winding axis, and may be inserted into the case in a direction parallel to the winding axis.

At least a portion of each of the first and second electrode assemblies may be enclosed by an insulating case.

Another exemplary embodiment provides a manufacturing method of a rechargeable battery, the method including: manufacturing a first electrode assembly and a second electrode assembly, each of the first and second electrode assemblies including electrodes of different polarities, each of the electrodes including an electrode plate and an electrode uncoated region protruding from the electrode plate; positioning the respective electrode uncoated regions of the first and second electrode assemblies having the same polarity to face each other; positioning current collecting members to respectively overlap at least a portion of a first surface of each of the electrode uncoated regions of the same polarity; respectively coupling the electrode uncoated regions and the current collecting members; positioning a cap assembly to face a second surface of each the electrode uncoated regions opposite the first surface; forming a battery assembly by bending the first and second electrode assemblies away from the cap assembly and toward each other such that the electrode uncoated regions are bent; and inserting the battery assembly into a case.

The manufacturing method may further include disposing one or more insulating members on at least one side of the current collecting members, after the electrode uncoated regions and the current collecting members are respectively coupled.

When one or more current collecting members of a rechargeable battery are formed as described in embodiments of the present invention, damage to an insulator (e.g., a separator), an electrode assembly, and/or other parts of the battery may be prevented or reduced (e.g., the damage may be caused by the current collecting member pressing on the insulator and/or the electrode assembly due to external impacts applied to the rechargeable battery).

Accordingly, the resulting rechargeable battery can prevent or reduce the risk of explosion due to damage, thereby providing the rechargeable battery with improved safety.

DETAILED DESCRIPTION

One or more embodiments of the present invention will be described more fully hereinafter with reference to the accompanying drawings, in which exemplary embodiments of the invention are shown.

As those skilled in the art would realize, the described embodiments may be modified in various different ways, all without departing from the spirit or scope of the present invention.

As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the inventive concept." Also, the term "exemplary" is intended to refer to an example or illustration.

As used herein, the term "substantially," "about," and similar terms are used as terms of approximation and not as terms of degree, and are intended to account for the inherent deviations in measured or calculated values that would be recognized by those of ordinary skill in the art.

Figure 1:
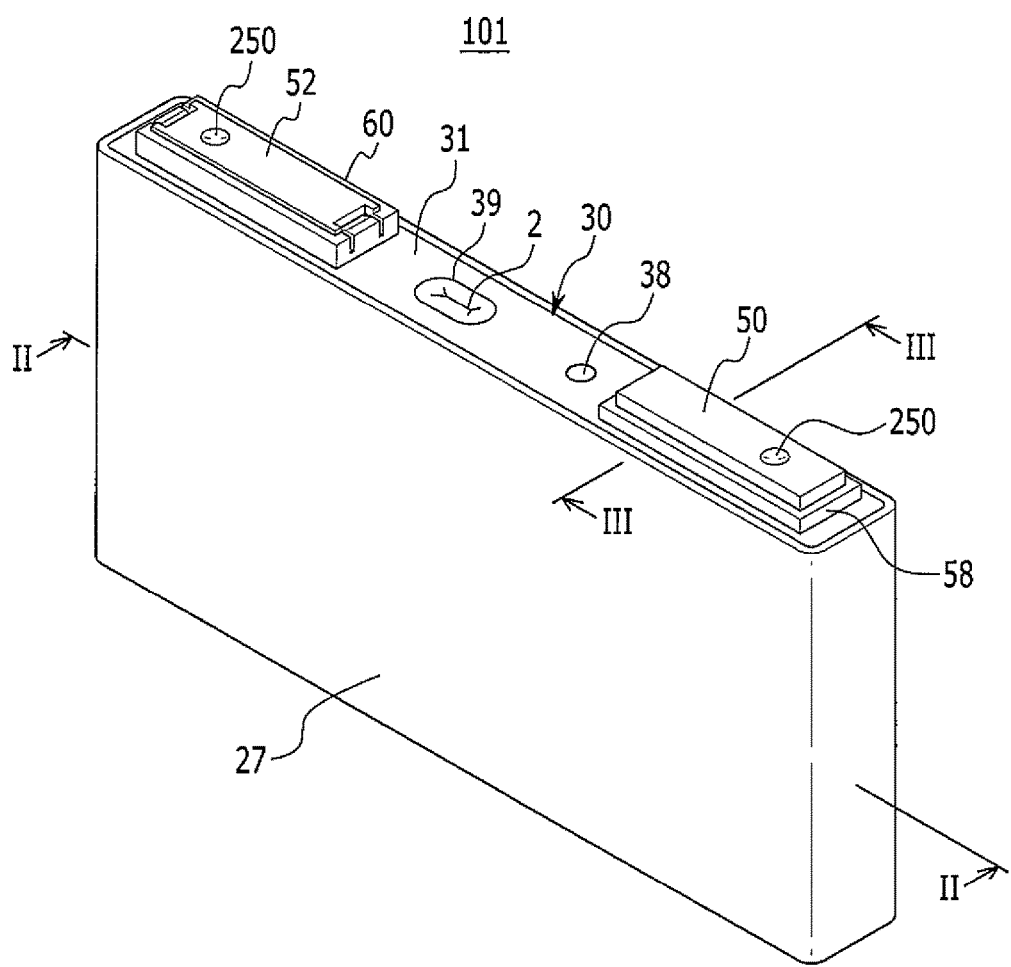
FIG. 1 is a perspective schematic view of a rechargeable battery according to an exemplary embodiment of the present invention.

In addition, like reference numerals designate like elements throughout the specification and the drawings. FIG. 1 is a perspective schematic view of a rechargeable battery according to an exemplary embodiment of the present invention, FIG. 2 is a cross-sectional schematic view of FIG. 1 taken along the line II-II, and FIG. 3 is a cross-sectional schematic view of FIG. 1 taken along the line III-III.

Figure 2:
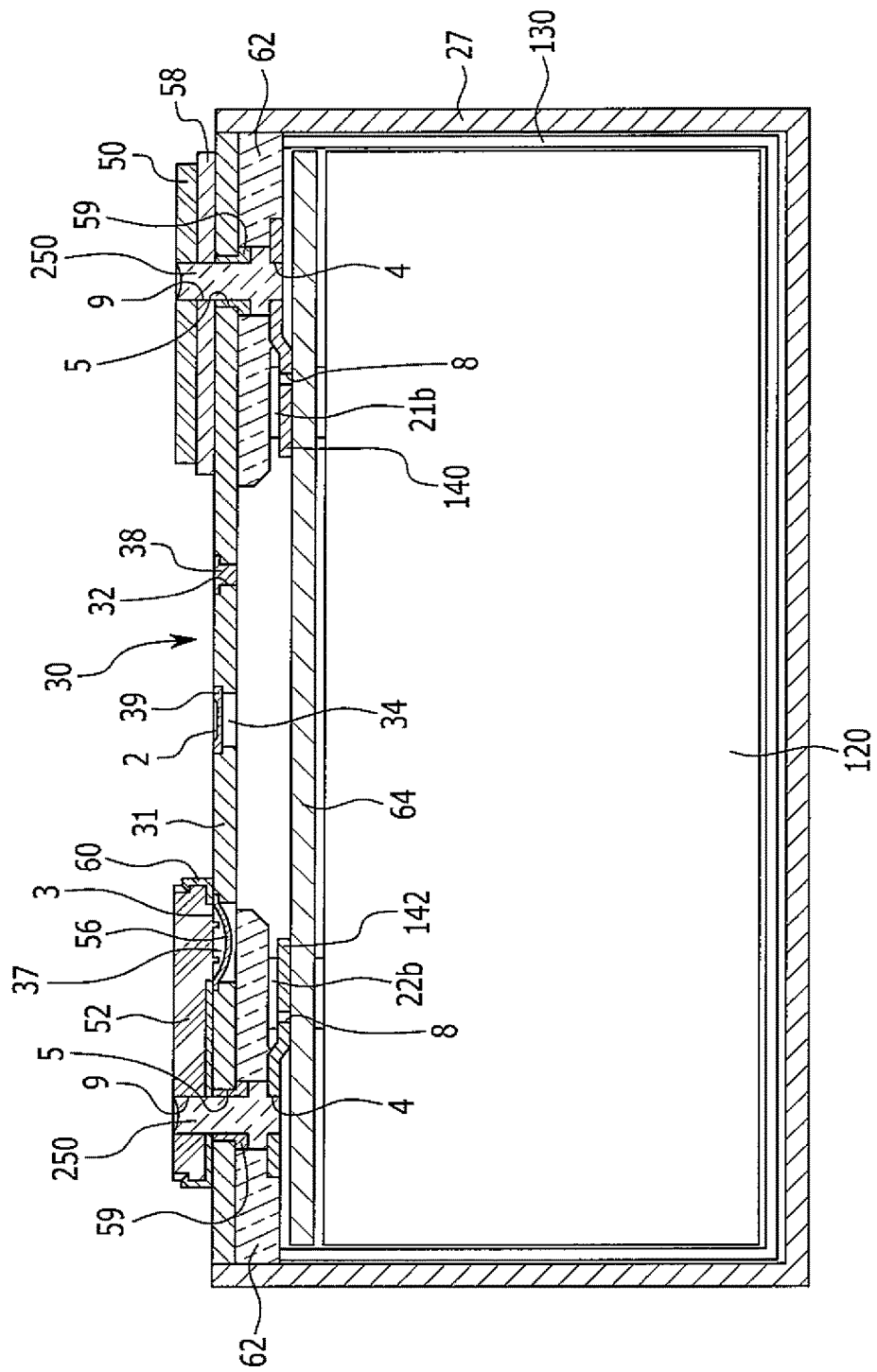
FIG. 2 is a cross-sectional schematic view of FIG. 1 taken along the line II-II.
Figure 3:
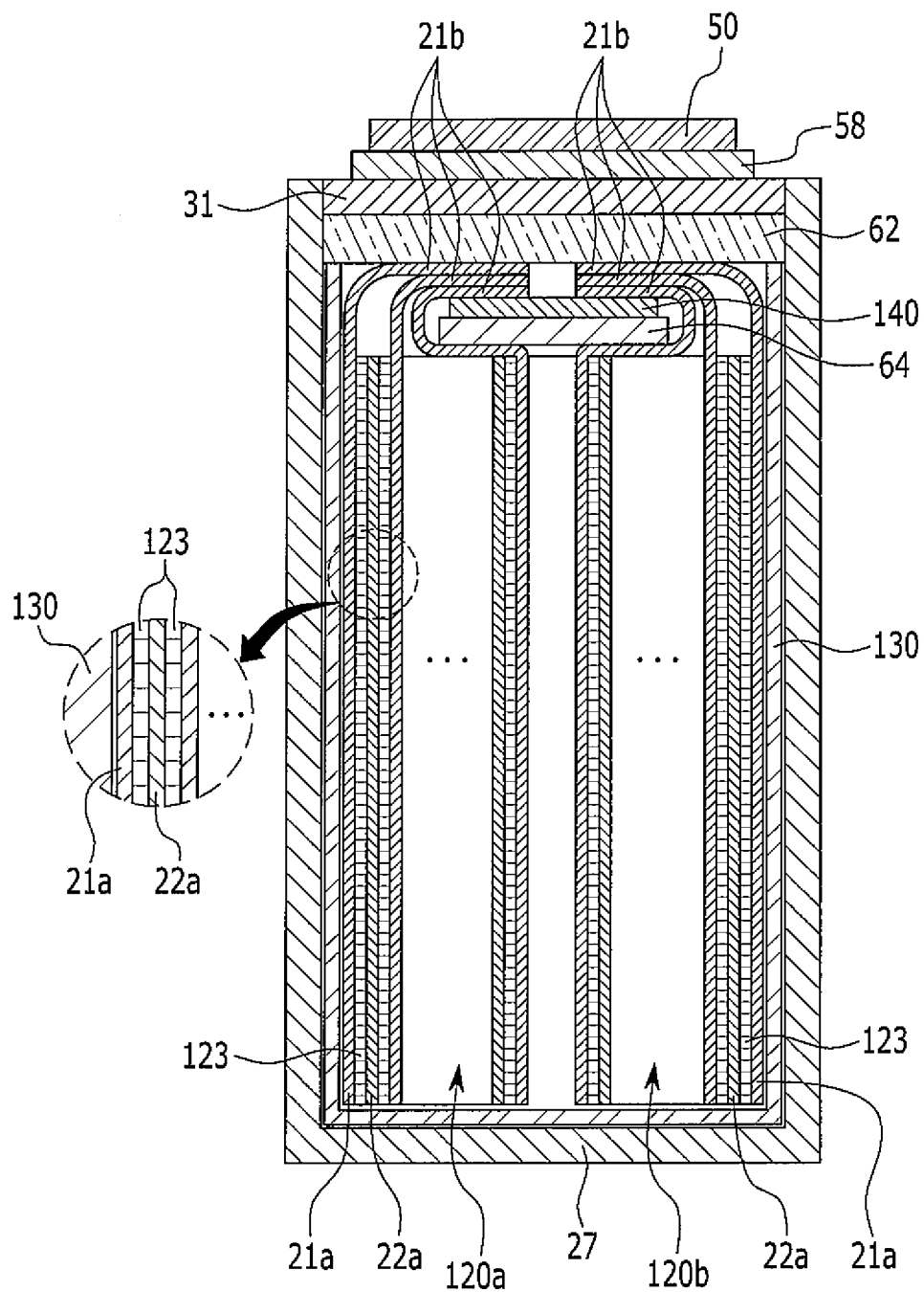
FIG. 3 is a cross-sectional schematic view of FIG. 1 taken along the line III-III.

As shown in FIGS. 1 to 3, the rechargeable battery 101 according to an exemplary embodiment of the present invention includes: an electrode assembly 120 that is spirally wound to include a separator 123 between a first electrode 121 and a second electrode 122, current collecting members 140 and 142 electrically coupled to the electrode assembly 120, a case 27 for accommodating the current collecting members 140 and 142 and the electrode assembly 120, and a cap assembly 30 coupled to sides of an opening of the case 27.

The rechargeable battery 101 is described herein as a lithium ion rechargeable battery having a prismatic shape.

However, embodiments of the present invention are not limited thereto, and may include batteries of various types (kinds) and shapes such as, for example, a lithium polymer battery, a cylindrical battery, and the like.

The electrode assembly 120 may include a plurality of electrode assemblies, for example, first and second electrode assemblies 120a and 120b, and each of the assemblies may include the separator 123 between the first electrode 121 and the second electrode 122, and may be flatly pressed after being spirally wound around a winding axis.

The first and second electrodes 121 and 122 may respectively include first and second electrode plates 21a and 22a, each of the first and second electrode plates 21a and 22a representing a region where an active material is coated on a thin plate formed of a metal foil, and first and second electrode uncoated regions 21b and 22b, each representing a region where the active material is not coated on the metal foil.

The first electrode plate 21a may be formed by coating a metal foil, for example, an aluminum foil, with an active material such as a transition metal oxide or the like, and the second electrode plate 22a may be formed by coating a metal foil, for example, a copper or nickel foil, with an active material such as graphite, carbon, or the like.

The first and second electrode uncoated regions 21b and 22b may be formed to protrude in the same direction toward the cap assembly 30.

The electrode assembly 120 may be inserted into the case 27 in a direction parallel to the winding axis, and the first and second electrode uncoated regions 21b and 22b may protrude toward the cap assembly 30 from an upper end of the electrode assembly 120.

The first and second electrode uncoated regions 21b and 22b may be spaced from each other and may have different polarities.

When manufacturing the first and second electrode plates 21a and 22a, the first and second electrode uncoated regions 21b and 22b may be cut to protrude upward in advance, and they may be respectively integrally formed with the first and second electrode plates 21a and 22a.

In addition, since each electrode assembly is formed by winding the electrode plates, the first and second electrode uncoated regions 21b may comprise a plurality of overlapping thin layers of metal foil.

Here, the plurality of thin layers may be connected to each other by ultrasonic welding to allow a current to easily flow.

The separator 123 may be disposed between the first and second electrode plates 21a and 22a and may serve to prevent or reduce the possibility of a short-circuit and to allow lithium ions to move. The separator 123 may be formed of polyethylene, polypropylene, or a composite film of polyethylene and polypropylene, but the materials for forming the separator 123 are not limited thereto.

After the electrode assembly 120 has been accommodated in the case 27, an electrolyte solution may be then injected into the case 27.

The electrolyte solution may be include an organic solvent such as EC (ethylene carbonate), PC (propylene carbonate), DEC (diethyl carbonate), EMC (ethyl methyl carbonate), and DMC (dimethyl carbonate), and a Li salt such as $LiPF_6$ and/or $LiBF_4$.

The electrolyte solution may be in a liquid, solid, or gel state.

The electrode assembly 120 may include the first and second electrode assemblies 120a and 120b, and the first and second electrode assemblies 120a and 120b may be electrically coupled to each other.

In the first and second electrode assemblies 120a and 120b, the respective electrode uncoated regions of the same polarity may be electrically coupled through a current collecting member.

In other words, the first electrode uncoated region 21b of the first electrode assembly 120a and the first electrode uncoated region 21b of the second electrode assembly 120b may be electrically coupled by the first current collecting member 140, and the second electrode uncoated region 22b of the first electrode assembly 120a and the second electrode uncoated region 22b of the second electrode assembly 120b may be electrically coupled by the second current collecting member 142.

In one embodiment, the first electrode uncoated regions 21b of the first and second electrode assemblies 120a and 120b are bent to face each other, and the second electrode uncoated regions 22b of the first and second electrode assemblies 120a and 120b are bent to face each other.

In one embodiment, each of the electrode uncoated regions includes a first uncoated region that is protruding from the electrode plates toward the cap assembly, and a second uncoated region bent from the first uncoated region and having at least a portion of one of its surfaces contacting the current collecting member 140 or 142. Accordingly, one surface of each of the first and second current collecting members 140 and 142 (the surface facing the cap plate) and one surface of each of the second uncoated regions (the surface facing the electrode assembly) may at least partially contact each other and may be electrically coupled to each other.

Since the first and second current collecting members 140 and 142 may have the same shape, only the first current collecting member 140 will be described in detail with reference to FIGS. 4 and 5.

Figure 4:
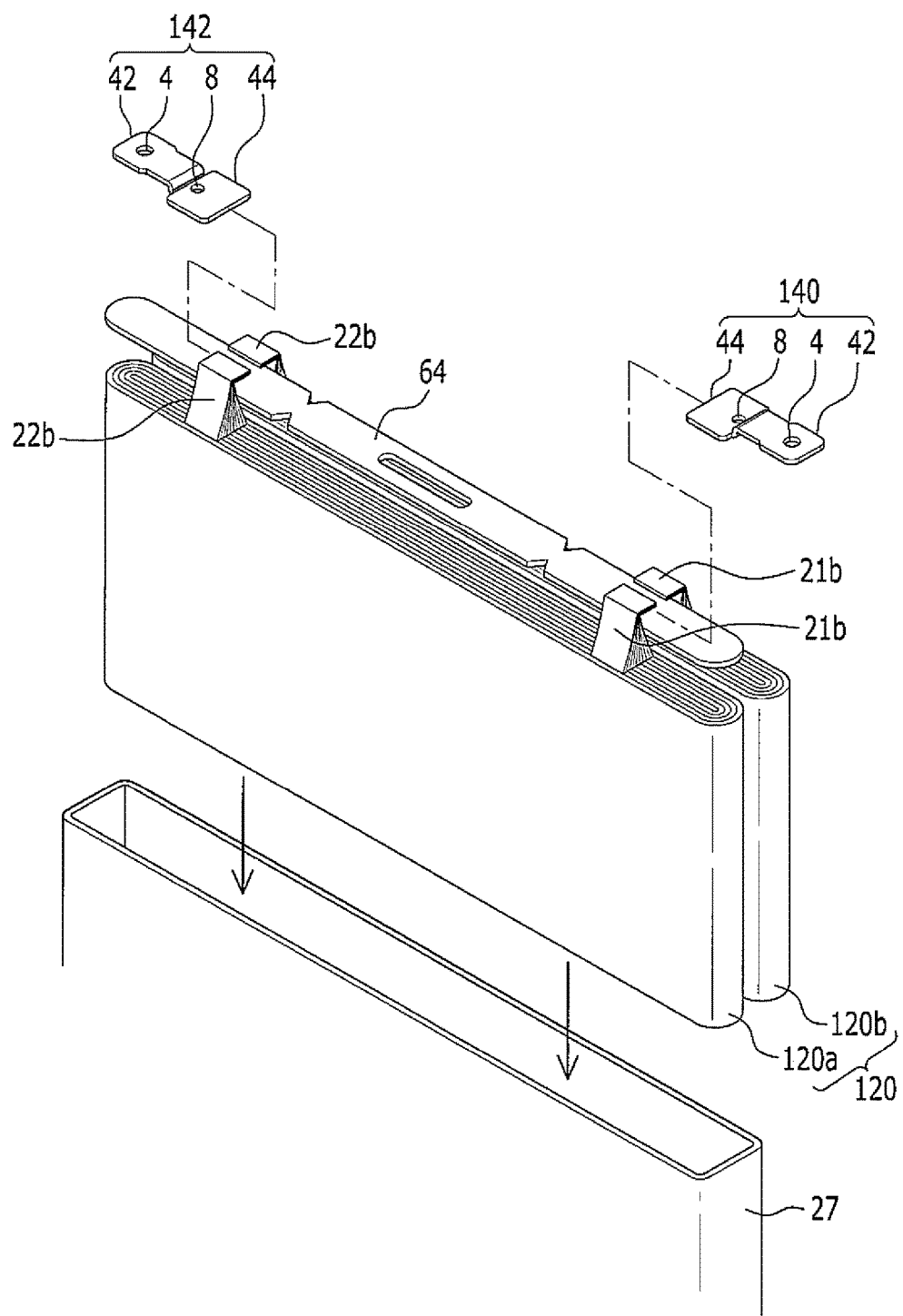
FIG. 4 is a partial exploded perspective schematic view of the rechargeable battery of FIG. 1.
Figure 5:
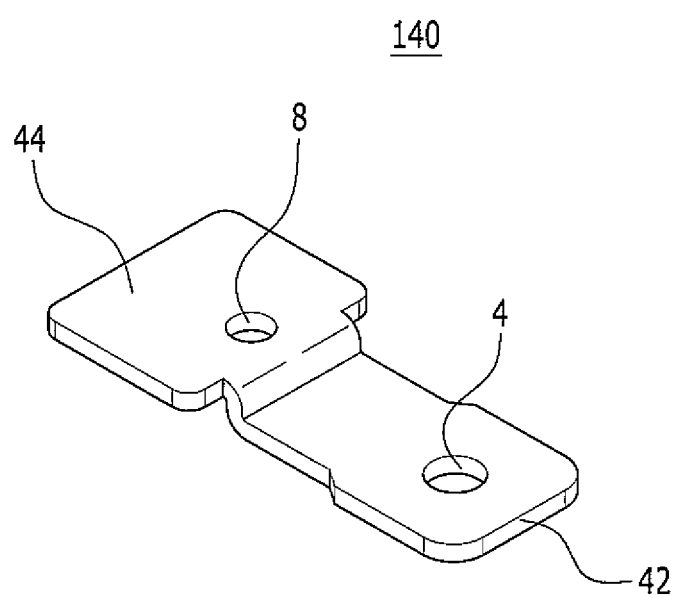
FIG. 5 is a perspective schematic view of a current collecting member according to an exemplary embodiment of the present invention.

FIG. 4 is a partial exploded perspective schematic view of the rechargeable battery of FIG. 1, and FIG. 5 is a perspective schematic view of a current collecting member according to one or more embodiments of the present invention.

For convenience of description, the cap assembly and a first insulating member are not illustrated in FIG. 4.

As shown in FIGS. 4 and 5, the first current collecting member 140 includes a first current collecting plate 42 having a substantially quadrangular plate shape, and a second current collecting plate 44 also having a substantially quadrangular plate shape, one end of the second current collecting plate 44 being coupled to the first current collecting plate 42.

The first and second current collecting plates 42 and 44 may be integrally formed, and may be formed of a low resistance metal such as copper.

The first and second current collecting plates 42 and 44 may be coupled to each other such that there is a step therebetween.

The step between the first and second current collecting plates 42 and 44 may compensate for a step formed when the second current collecting plate is coupled to the electrode uncoated region. Accordingly, the step between the first and second current collecting plates can be formed to correspond to a thickness of the electrode uncoated region, such that when the electrode uncoated region is coupled to the second current collecting plate, the top surface of the electrode uncoated region and the top surface of the first current collecting plate are on substantially the same level, and the step formed after the current collecting member and the electrode uncoated region are connected is minimized.

The first current collecting plate 42 may include a first terminal hole 4 into which a connecting terminal 250 may be inserted. The connecting terminal 250 may be coupled to a first terminal 50 outside of the cap assembly 30 (see FIG. 2) to allow the current to flow. The first terminal hole 4 may have the same (or substantially the same) shape as the cross-section of the connecting terminal 250, for example, a circular shape.

The second current collecting plate 44 may have a greater width than the first current collecting plate 42, since the second current collecting plate 44 contacts and couples the electrode uncoated regions of the same polarity of the two neighboring electrode assemblies.

In one embodiment, the second current collecting plate 44 may have a jig hole 8 into which a jig can be inserted.

Referring back to FIGS. 1 to 3, the case 27 may have a substantially cuboid shape, and an opening may be formed at one side thereof.

The case 27 may be formed of a metal such as aluminum, stainless steel, or the like, but the metal for forming the case 27 is not limited thereto.

The cap assembly 30 may include a cap plate 31 that covers the opening of the case 27, the first terminal 50 that protrudes out of the cap plate 31 and is electrically coupled to the first electrode 121, and a second terminal 52 that protrudes out of the cap plate 31 and is electrically coupled to the second electrode 122.

The cap plate 31 may have a plate shape that is elongated in one direction (e.g., extending between the terminals), and may be coupled to the opening of the case 27.

The cap plate 31 may be formed of the same material as the case 27, and may be laser-welded to be coupled to the case 27.

Accordingly, the cap plate 31 may have the same polarity as the case 27.

The cap plate 31 may include an electrolyte injection opening 32 into which the electrolyte solution is injected, and a second terminal hole 5 into which the connecting terminal 250 is inserted.

In addition, a vent plate 39 with a notch 2 may be formed in a vent hole 34, and may be configured to be ruptured at a predetermined pressure (e.g., when the pressure inside the case 27 increases).

In one embodiment, a sealing cap 38 is installed in the electrolyte injection opening 32, and the connecting terminal 250 is inserted into the second terminal hole 5.

The first and second terminals 50 and 52 may be each formed above the cap plate 31.

The first terminal 50 may be electrically coupled to the first electrode 121 through the first current collecting member 140, and the second terminal 52 may be electrically coupled to the second electrode 122 through the second current collecting member 142.

However, embodiments of the present invention are not limited thereto, and the rechargeable battery may have a structure in which the first terminal 50 is electrically coupled to the second electrode, and the second terminal 52 is electrically coupled to the first electrode.

The first terminal 50 may have a rectangular plate shape, but is not limited thereto.

The first terminal 50 may be electrically coupled to the first electrode 121 through the connecting terminal 250 that is inserted into the first and second terminal holes 4 and 5 as well as a third terminal hole 9 of a connecting member 58 such that it is bonded to the first current collecting member 140.

The connecting terminal 250 may have a pillar shape, and an upper end of the connecting terminal 250 may be fixed to the first terminal 50 by welding while being inserted into the third terminal hole 9.

A lower end of the connecting terminal 250 may be fixed to the first current collecting member 140 by welding while being inserted into the first terminal hole 4.

Accordingly, the first electrode 121 may be electrically coupled to the first terminal 50 through the first current collecting member 140 and the connecting terminal 250.

In one embodiment, a sealing gasket 59 is installed in the second terminal hole 5 to insulate the connecting terminal 250 from the cap plate 31.

Similar to the first terminal 50, the second terminal 52 may be electrically coupled to the second electrode 122 through the connecting terminal 250 that is inserted into the first to third terminal holes 4, 5, and 9 and is bonded to the second current collecting member 142.

The connecting member 58 may be formed between the first terminal 50 and the cap plate 31, and a first insulating member 60 may be formed between the second terminal 52 and the cap plate 31.

Accordingly, the case 27 and the cap plate 31 may both have the same polarity as that of the first electrode 121, since they are electrically coupled to the first terminal 50 through the connecting member 58.

The second terminal 52 may be insulated from the cap plate 31 by the first insulating member 60.

A short-circuit protrusion 3 may be formed under the second terminal 52 to correspond to a position of a short-circuit hole 37 that is formed in the cap plate 31, the short-circuit protrusion 3 protruding downward, toward the current collecting member 142.

The second terminal 52 may be elongated in one direction (e.g., extending along the direction of elongation of the cap plate 31) and may cover the short-circuit hole 37.

Accordingly, the first insulating member 60 may be installed to contact the elongated bottom side of the second terminal 52 (e.g., the side of the second terminal 52 facing the cap plate), and may also enclose the lateral sides of the second terminal 52 extending upward from both ends of the elongated bottom side.

A short-circuit member 56 may be installed in the short-circuit hole 37 of the cap plate 31 and may be coupled to side walls of the short-circuit hole 37, so as to be capable of facilitating a short-circuit between the first and second electrodes 121 and 122.

The short-circuit member 56 includes a curved portion that is concaved toward the electrode assembly 120 to have an arc shape, and one or more edge portions of the curved portion may be fixed to one or more of the side walls of the short-circuit hole 37.

When gas is generated inside the rechargeable battery due to an abnormal (or undesired) reaction inside the rechargeable battery, internal pressure of the rechargeable battery may increase.

When the internal pressure of the rechargeable battery exceeds a predetermined (or set) pressure, the curved portion of the short-circuit member 56 is convexly deformed upward toward the second terminal 52 to contact the short-circuit protrusion 3 of the second terminal 52, thereby causing a short-circuit.

As such, when the short-circuit occurs, no battery reaction occurs (i.e., the battery stops operating), and thus the possibility of explosion or the like of the battery due to increased internal pressure may be prevented or reduced.

In one embodiment, a second insulating member 62 is formed between the cap plate 31 and each of the first and second current collecting members 140 and 142, and a third insulating member 64 is formed between the first and second current collecting members 140 and 142 and the electrode assembly 120.

The second insulating member 62 may be integrally formed with an insulating case 130, which may enclose the electrode assembly 120.

In addition to their insulating function, the second and third insulating members 62 and 64 may provide structural support for the first and second current collecting members 140 and 142.

Accordingly, when the electrode uncoated regions of the neighboring electrode assemblies are coupled by the current collecting members as described above, the second and third insulating members 62 and 64 may prevent or reduce the possibility of damage to the current collecting members, even if there are external impacts on the battery.

Figure 6:
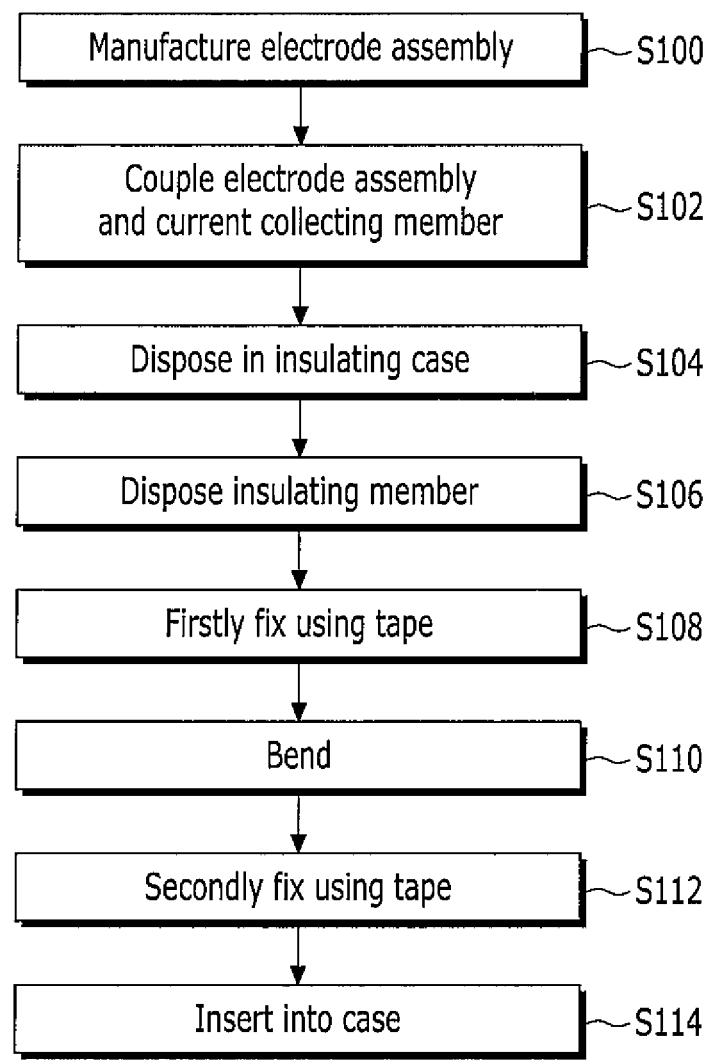
FIG. 6 is a flowchart illustrating a manufacturing sequence of a rechargeable battery according to an exemplary embodiment of the present invention.

FIG. 6 is a flowchart illustrating a manufacturing method of a rechargeable battery according to one or more embodiments of the present invention.

As shown in FIG. 6, the manufacturing method of the rechargeable battery according to one or more embodiments of the present invention includes: manufacturing an electrode assembly (S100); coupling the electrode assembly to a current collecting member (S102); placing the resulting structure in an insulating case (S104); positioning an insulating member over the current collecting member (S106); initially fixing the electrode assembly to the insulating case using a tape (S108); bending the electrode assembly (S110); subsequently fixing the resulting structure using the tape (S112); and inserting the resulting structure into a case (S114).

A more detailed description of the manufacturing method described in FIG. 6 will be given with reference to FIGS. 7 to 14.

FIGS. 7 to 14 are perspective schematic views schematically illustrating intermediate steps of manufacturing the rechargeable battery according to the flowchart of FIG. 6.

Figure 7:
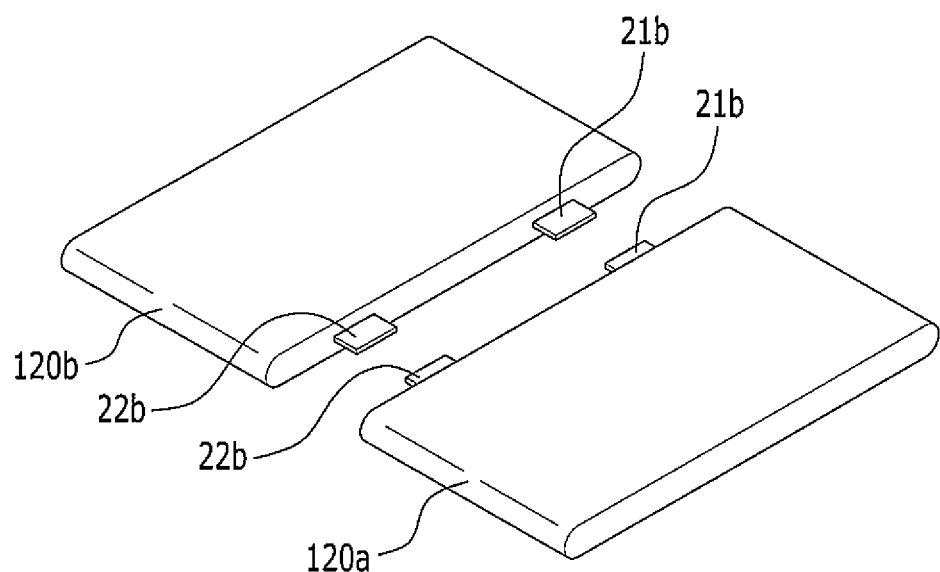
FIGS. 7 to 14 are perspective views schematically illustrating intermediate steps in manufacturing the rechargeable battery according to the flowchart of FIG. 6.
Figure 8:
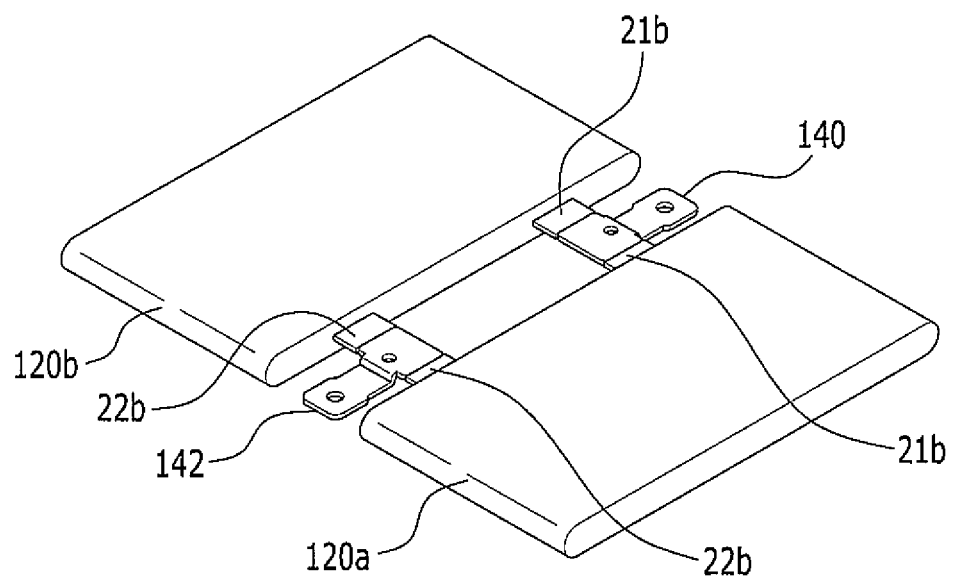

Referring to FIGS. 7 and 8, after the first electrode assembly 120a and the second electrode assembly 120b are manufactured, the electrode uncoated regions 21b and 22b of each electrode assembly are each independently ultrasonically welded (S100).

Specifically, a plurality of thin plates, which each of the electrode uncoated regions includes, are bonded to each other by welding to be electrically coupled to each other.

Next, the electrode uncoated regions 21b and 22b of the first electrode assembly 120a are respectively positioned to face the electrode uncoated regions 21b and 22b of the second electrode assembly 120b of the same polarity.

In this case, the first and second electrode assemblies 120a and 120b are separated from each other by a distance that is set to be smaller than a width of a second current collecting plate of the current collecting member, thereby allowing the second current collecting plate to at least partially overlap the electrode uncoated regions of the same polarity that face each other.

Next, as shown in FIGS. 6 and 8, after the current collecting members 140 and 142 are positioned to overlap the respective electrode uncoated regions of the first and electrode assemblies 120a and 120b, the current collecting members 140 and 142 and the respective electrode uncoated regions 21b and 22b are connected by ultrasonic welding (S102).

Figure 9:
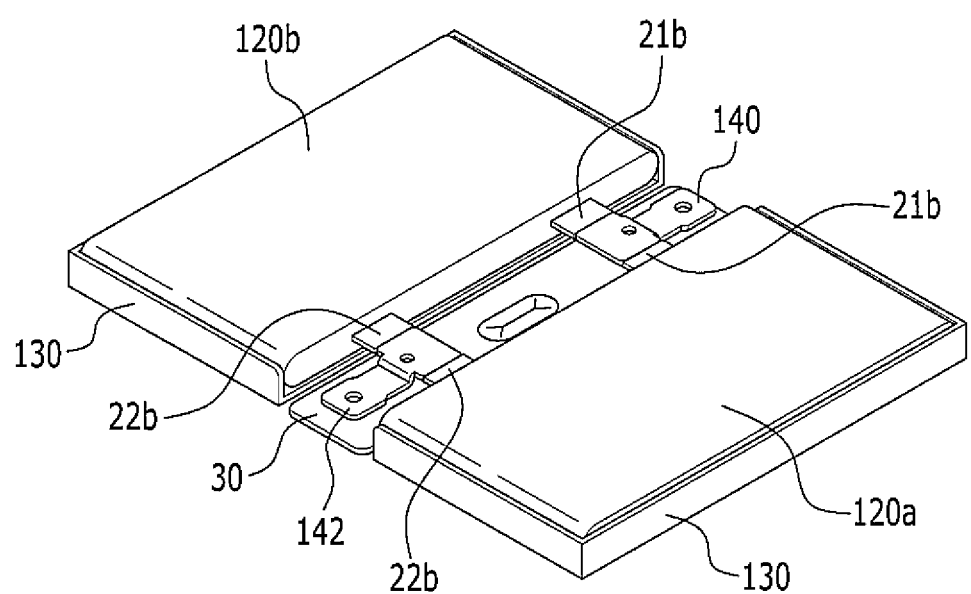

Next, as shown in FIGS. 6 and 9, the electrode assemblies 120a and 120b connected with the current collecting members 140 and 142 are placed inside the insulating case 130 attached to the cap assembly 30 (S104).

Here, connecting terminals of the cap assembly 30 (refer to 250 of FIG. 2) are inserted into the terminal holes 4 of the current collecting members 140 and 142, and are laser-welded to the current collecting members 140 and 142, thus electrically connecting the current collecting members 140 and 142 and the connecting terminals.

The electrode assembly illustrated in FIG. 9, is inserted into the insulating case 130 connected with the insulating member 62. However, embodiments of the present invention are not limited thereto, and if necessary, the insulating member 62 may be formed only in portions that correspond to the cap assembly 30.

Figure 10:
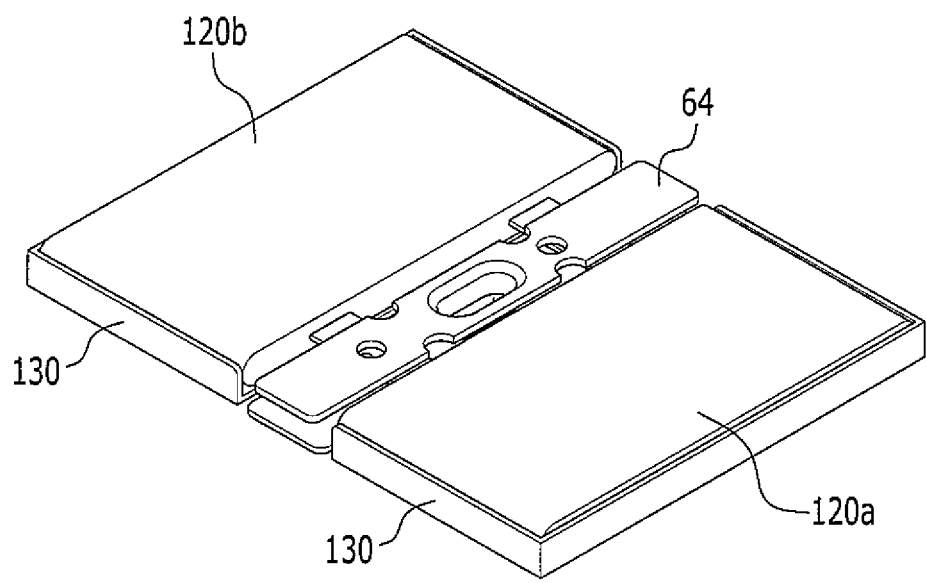

Next, as shown in FIGS. 6 and 10, the third insulating member 64 is positioned over the current collecting members 140 and 142 (S106).

Figure 11:
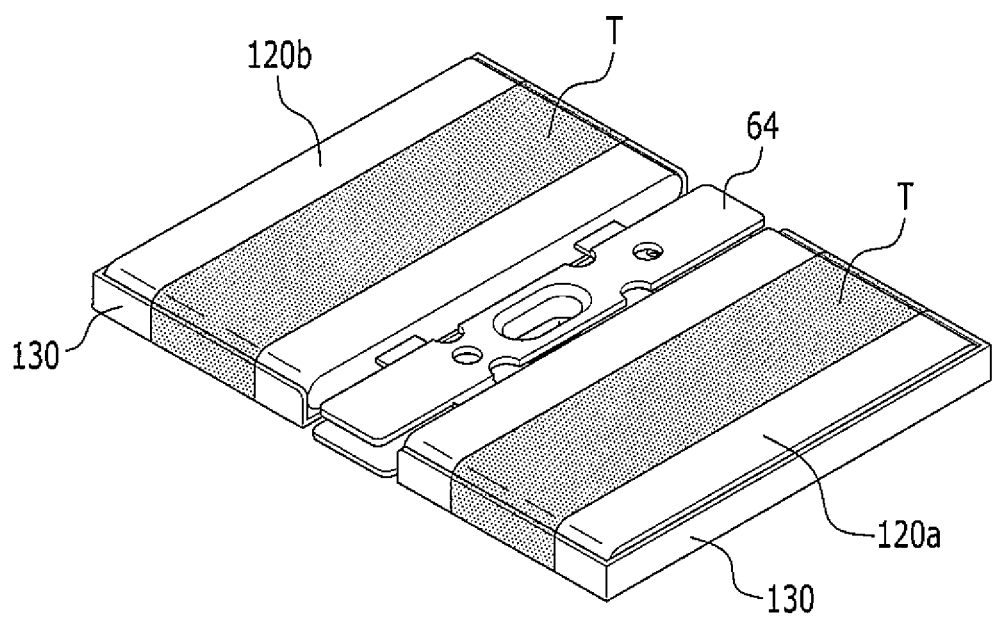

Next, as shown in FIGS. 6 and 11, the electrode assembly (e.g., each of the first and second electrode assemblies 120a and 120b) and the insulating case 130 are initially fixed together using an insulating tape T (S108).

Figure 12:
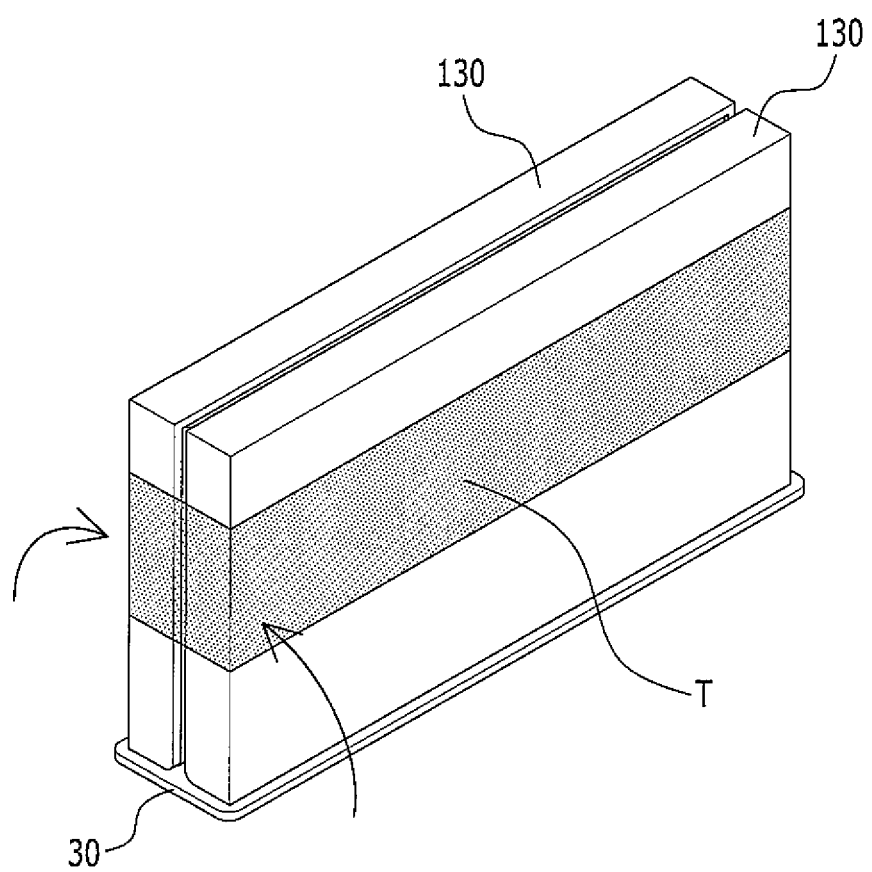

Next, as shown in FIGS. 6 and 12, the first and second electrode assemblies 120a and 120b, together with the insulating case 130, are bent from the cap assembly 30 toward each other, so as to face each other (S110), thereby exposing the cap assembly 30 to the outside.

Here, the portions of the electrode uncoated regions that do not overlap with the current collecting members 140 and/or 142 are bent (as shown in FIG. 3). Accordingly, the electrode uncoated regions are each divided into a first uncoated region protruding from the electrode assembly and a second uncoated region bent from the first uncoated region, at least a portion of the second uncoated region contacting one of the current collecting members 140 and 142.

Figure 13:
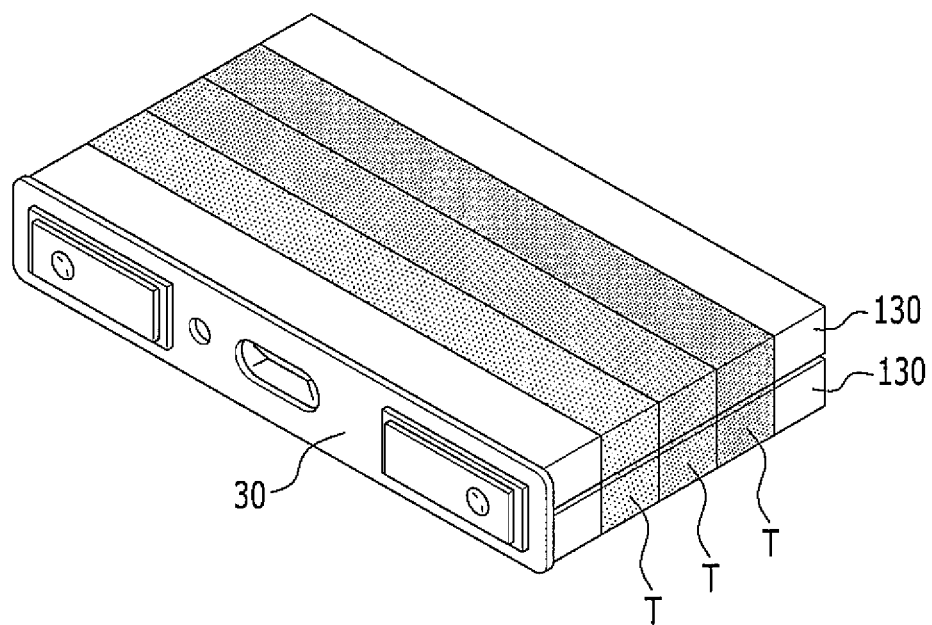

Next, as shown in FIGS. 6 and 13, using the insulating tape T, the first and second electrode assemblies in the insulating case 130 are bound together to be secondly fixed (S112), thereby manufacturing a battery assembly 133.

Figure 14:
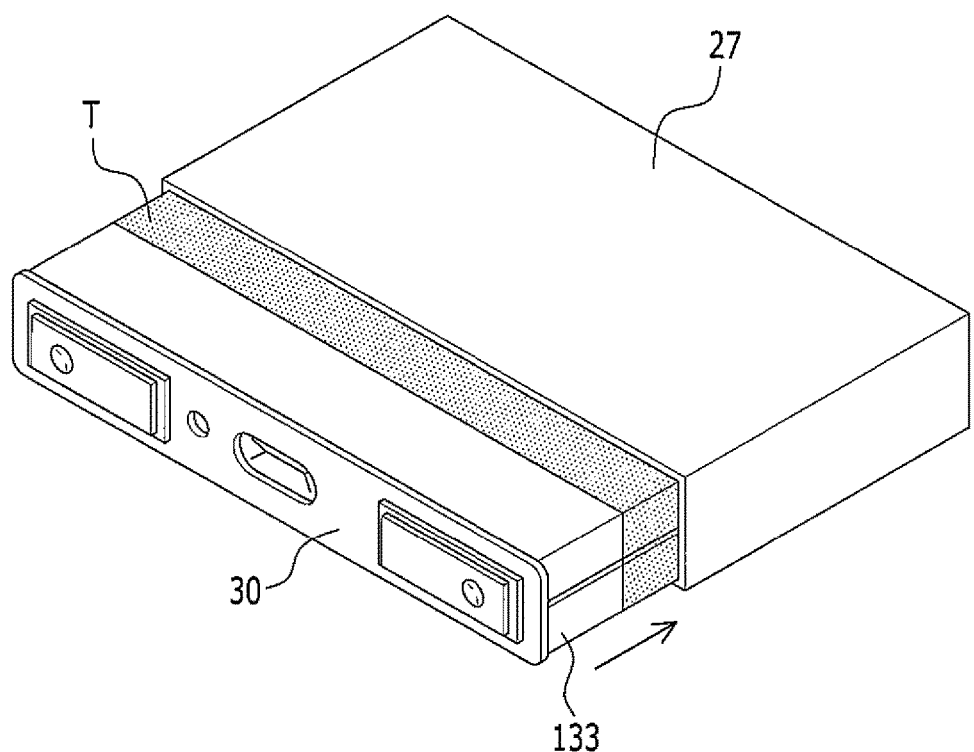

Subsequently, as shown in FIGS. 6 and 14, the battery assembly 133 is inserted into the case 27 (S114) and an opening of the case 27 is then sealed by the cap assembly 30, as shown in FIG. 1, thereby completing the manufacture of the rechargeable battery 101.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and equivalents thereof.

Description of Symbols

| | |
|---|---|
| 2: notch | 3: short-circuit protrusion |
| 4: first terminal hole | 5: second terminal hole |
| 27: case | 30: cap assembly |

Description of Symbols

| | |
|---|---|
| 31: cap plate | 32: electrolyte injection opening |
| 34: vent hole | 37: short-circuit hole |
| 38: sealing cap | 39: vent plate |
| 42: first current collecting plate | 44: second current collecting plate |
| 50: first terminal | 52: second terminal |
| 58: connecting member | 59: sealing gasket |
| 60: first insulating member | 62: second insulating member |
| 64: third insulating member | 140, 142: current collecting members |
| 250: connecting terminal | |

What is claimed is:

1. A rechargeable battery comprising:
   a first electrode assembly and a second electrode assembly, each of the first and second electrode assemblies comprising a first electrode and a second electrode, each of the first and second electrodes comprising an electrode plate and an electrode uncoated region;
   a case accommodating the first and second electrode assemblies;
   a cap assembly sealing the case;
   a first current collecting member electrically connecting the first electrode of the first electrode assembly and the first electrode of the second electrode assembly; and a second current collecting member electrically connecting the second electrode of the first electrode assembly and the second electrode of the second electrode assembly,
   wherein the electrode uncoated regions each independently include a first uncoated region protruding toward the cap assembly from the respective electrode plate, and a second uncoated region bent from the first uncoated region,
   wherein the electrode uncoated regions of the first electrodes of each of the first and second electrode assemblies are bent to face each other, and the electrode uncoated regions of the second electrodes of each of the first and second electrode assemblies are bent to face each other, and
   wherein each of the first and second current collecting members comprises a first current collecting plate coupled with a connecting terminal, and a second current collecting plate, one surface of the second current collecting plate of the first current collecting member contacting at least a portion of one surface of each of the second uncoated regions of the first electrodes of the first and second electrode assemblies and one surface of the second current collecting plate of the second current collecting member contacting at least a portion of one surface of each of the second uncoated region of the second electrodes of the first and second electrode assemblies, and
   wherein the first and second current collecting plates have a step therebetween.

2. The rechargeable battery of claim 1, wherein the electrode uncoated regions contact the surface of the second current collecting plate facing the cap assembly.

3. The rechargeable battery of claim 1, wherein the first current collecting plate comprises a first terminal hole through which the connecting terminal is inserted.

4. The rechargeable battery of claim 3, wherein the connecting terminal is further inserted through a second terminal hole in the cap assembly.

5. The rechargeable battery of claim 1, wherein a height of the step corresponds to a height of the electrode uncoated region in a direction extending toward the cap assembly.

6. The rechargeable battery of claim 1, wherein a width of the second current collecting plate is greater than a width of the first current collecting plate in a direction extending across the first and second electrode assemblies.

7. The rechargeable battery of claim 1, wherein the portion of one surface of the second uncoated region contacting one of the first and second current collecting members faces the electrode assembly.

8. The rechargeable battery of claim 1, wherein the first and second electrode assemblies are each independently spirally wound around a winding axis, and are inserted into the case in a direction parallel to the winding axis.

9. The rechargeable battery of claim 8, wherein at least a portion of each of the first and second electrode assemblies is enclosed by an insulating case.

\* \* \* \* \*